United States Patent [19]
Baker et al.

[11] Patent Number: 5,389,126
[45] Date of Patent: Feb. 14, 1995

[54] PROCESS FOR REMOVAL OF COMPONENTS FROM LIQUIDS IN BATCH MODE

[75] Inventors: Richard W. Baker, Palo Alto; Harmohinder S. Bedi, San Ramon, both of Calif.

[73] Assignee: Membrane Technology and Research, Inc., Menlo Park, Calif.

[21] Appl. No.: 124,935

[22] Filed: Sep. 21, 1993

Related U.S. Application Data

[63] Continuation-in-part of Ser. No. 890,931, May 29, 1992, Pat. No. 5,273,572.

[51] Int. Cl.[6] .................. B01D 53/22; B01D 19/00
[52] U.S. Cl. ................................ 95/45; 95/258; 95/263; 95/264; 95/265; 95/266
[58] Field of Search .................. 95/45, 47–54, 95/241, 243, 245, 246, 250, 251, 254, 258, 259, 263–266

[56] References Cited

U.S. PATENT DOCUMENTS

| | | | |
|---|---|---|---|
| 1,396,632 | 11/1921 | Jensen | 95/266 X |
| 4,300,919 | 11/1981 | Lewis et al. | 95/259 |
| 4,407,665 | 10/1983 | Lasater | 95/266 |
| 4,412,924 | 11/1983 | Feather | 95/263 X |
| 4,444,571 | 4/1984 | Matson | 55/54 X |
| 4,517,094 | 5/1985 | Beall | 210/664 |
| 4,553,983 | 11/1985 | Baker | 55/16 |
| 4,713,089 | 12/1987 | Robbins | 55/198 X |
| 4,737,283 | 4/1988 | Gresch | 55/189 X |
| 4,772,295 | 9/1988 | Kato et al. | 55/16 |
| 4,793,841 | 12/1988 | Burr | 55/16 X |
| 4,857,198 | 8/1989 | Meidl | 210/603 |
| 4,892,564 | 1/1990 | Cooley | 55/158 X |
| 4,892,664 | 1/1990 | Miller | 210/747 |
| 4,906,256 | 3/1990 | Baker et al. | 55/16 |
| 4,979,886 | 12/1990 | Rippberger | 55/196 X |
| 5,032,148 | 7/1991 | Baker et al. | 55/16 |
| 5,051,113 | 9/1991 | Nemser | 55/158 X |
| 5,051,114 | 9/1991 | Nemser et al. | 55/158 X |
| 5,053,059 | 10/1991 | Nemser | 55/158 X |
| 5,069,686 | 12/1991 | Baker et al. | 55/16 |
| 5,071,451 | 12/1991 | Wijmans | 55/16 |
| 5,089,033 | 2/1992 | Wijmans | 55/16 |
| 5,102,432 | 4/1992 | Prasad | 55/158 X |
| 5,122,165 | 6/1992 | Wang et al. | 55/196 X |
| 5,122,166 | 6/1992 | Hyrcyk et al. | 55/196 X |
| 5,129,924 | 7/1992 | Baker et al. | 55/158 X |
| 5,147,417 | 9/1992 | Nemser | 55/158 X |
| 5,273,572 | 12/1993 | Baker et al. | 95/48 |

FOREIGN PATENT DOCUMENTS 189772  11/1923  United Kingdom ............... 95/263

*Primary Examiner*—Robert Spitzer
*Attorney, Agent, or Firm*—J. Farrant

[57] ABSTRACT

A process for removing components from liquid is disclosed. This process involves batchwise gas-stripping followed by membrane separation treatment of the stripping gas. The stripping step can be carried out by circulating the batch repeatedly around the loop formed by the tank and the stripper for sufficient time until the desired degree of component removal is achieved. An additional tank can also be used to avoid mixing treated and untreated liquid streams. The membrane separation step can be carried out using a single-stage membrane unit or a multistage unit. The process is particularly suited for treatment of industrial streams that are small intermittent streams and vary in composition and concentration.

48 Claims, 5 Drawing Sheets

PROCESS FOR REMOVAL OF COMPONENTS FROM LIQUIDS IN BATCH MODE

This application is a continuation-in-part of U.S. patent application Ser. No. 890,931, "Process for Removing an Organic Compound from Water," filed May 29, 1992, now U.S. Pat. No. 5,273,572. The content of the apparent application is incorporated herein by reference in its entirety.

FIELD OF THE INVENTION

This invention relates to a process for removing components from water. More particularly, the invention relates to a batchwise gas-stripping process adapted so that the exhaust gas from the stripper can be treated by a membrane separation process. Gas stripping in batch mode removes the components present in intermittent feed streams and in feed streams of varying composition and volume.

BACKGROUND OF THE INVENTION

Stripping is a process used to remove volatile components from water. The basic concept is to bring the contaminated water into intimate contact with a stripping gas, frequently air, so that the volatile compounds undergo a phase change from liquid to vapor and are carried away by the stripping gas. A number of interrelated design factors affect the stripping efficiency: the Henry's law coefficient, the stripping gas:water volume ratio, the contact time and mass transfer rate. The gas:water volume ratio used depends on the volatility of the component to be removed, its concentration in the feed water and the physical attributes under which the contact is carded out. It is typically in the range 50:1–500:1 or more. The component being removed is, therefore, diluted by this amount when it is transferred from water to the gas. When other factors are constant, a high gas:water volume ratio provides a high percentage of component removal from the water, but creates large volumes of gas contaminated with dilute concentrations of component. A low gas:water volume ratio may provide insufficient dilution of the component in the gas to maintain a good driving force for mass transfer. Under optimum conditions, transfer of the organic compound from the water to the gas can be very efficient and removal rates up to 99.99% can be achieved.

The design of a stripping system depends on the nature of the feed stream to be treated and the desired composition of the water stream exiting the stripper. In comparing different processes, consideration should always be given to the advantages of batchwise and continuous operation. Industrial operations that generate large streams (more than 10,000 gpd) of relatively uniform concentration justify employing a continuous stripping operation because the high cost of continuous equipment and instrumentation (process control devices) is outweighed by the advantages of a lower unit investment, operating cost, and uniform quality. Industrial operations that generate small (100–10,000 gpd), intermittent streams or streams with varying composition or components do not employ continuous stripping because either the high cost of continuous equipment and instrumentation is not justified or the streams themselves are not capable of treatment in continuous mode. In such cases, treatment of the stream by batchwise stripping is preferred and far more efficient.

To date, however, the benefit of the combined separation by a stripper-membrane unit has not been available to industrial operations that generate small, intermittent streams, or streams with varying compositions or components. Such potential users may not have the resources of large plants to pool, adjust or pretreat feed streams to bring them within tight starting parameters for treatment in continuous operations. There exists, therefore, a need for separation equipment that offers flexibility from a standard design and that is within the economic and technical resources of relatively small companies.

SUMMARY OF THE INVENTION

The invention is an improved gas-stripping process, involving a combination of a gas-stripping operation, in batch mode, followed by a membrane separation operation to treat the exhaust gas from the stripper. It has been found possible to combine batchwise gas-stripping and membrane separation so as to maintain adequate water treatment and simultaneously reduce or eliminate discharge of contaminated gas. The invention is also designed to remove components from small intermittent streams.

The process of the invention has several aspects. The aspects of the invention can be made clear by looking at the combination of the membrane separation step and the stripping step.

The principal disadvantage of gas stripping is the air pollution caused by the discharge of the waste gas. A membrane separation step, subsequent to gas-stripping, offers a viable method in eliminating air pollution. The component laden stripping gas from the stripper is fed into a membrane separation unit which is either more permeable to the component than the stripping gas or more permeable to the stripping gas than the component. This allows the membrane separation step to separate and recover the stripped components and simultaneously regenerate the stripping gas. The regenerated stripping gas is either recycled or discharged. The combined system operates preferably in an essentially closed loop, so that no waste gas is vented to the atmosphere, thereby eliminating air pollution. Operating in a recycle loop also makes it economically feasible to use more expensive stripping gases, such as nitrogen, rather than air.

While the invention is similar to the copending parent application No. 890,931, now U.S. Pat. No. 5,273,572, in its membrane operation, it significantly differs in its gas stripping operation.

Membrane Operation

The aspects of the invention discussed in the copending parent application also apply to this invention and are set forth.

In one aspect, the membrane separation is used to recover the component for reuse in the process producing the contaminated stream and to simultaneously regenerate the stripping gas, which is fed back to the gas inlet of the stripper. It has been found that adequate stripping can be achieved by operating the stripper in recycle batch mode, even though the recirculated gas contains substantial amounts of the stripped component. Because the stripping gas is reused, it is economically practical to use nitrogen, methane or another gas of choice in the stripping step. Where corrosion can be a problem, nitrogen is preferred over air.

In another aspect, the invention matches the operating constraints of the gas-stripping unit and the membrane unit. The stripping operation is carried out with a lower than normal gas:water volume ratio. This decreases the performance of the stripping unit, but produces a smaller-volume, higher-concentration exhaust gas, amenable to efficient treatment by membrane separation. Such a design may be appropriate where a tradeoff between slightly lower water quality and reduced air pollution is indicated.

In another aspect, the invention involves operating the gas-stripping step under reduced pressure. This reduces the volume and increases the concentration of the exhaust gas fed to the membrane separation step.

Gas-Stripping Operation in Batch Mode

The invention differs from that described in copending parent application No. 890,931, now U.S. Pat. No. 5,273,572, in that the gas-stripping operation is explicitly defined as being carried out in batch mode, in other words by processing a discrete batch of liquid in a finite time period, rather than by processing continuously.

In one aspect of the invention, the batch process may be carried out as a one-stage operation by circulating the batch repeatedly around the loop formed by the batch tank and the stripper. In a preferred mode of carrying out the process of the invention in this aspect, a batch of liquid is circulated in this loop for sufficient time to cause a desired degree of component stripping from the liquid. The gas stream laden with the stripped component is fed into a membrane operation and the liquid stream depleted of the stripped component is discharged or reused.

Alternatively, the batch process may be carried out in two stages by passing the batch once through the stripper and holding the liquid stream depleted of the stripped component in a batch tank. This liquid stream is then circulated repeatedly around the loop formed by the batch tank and the stripper. In a preferred mode of carrying out the process of the invention in this aspect, a batch of liquid is circulated in this loop for sufficient time to cause a desired degree of component stripping from the liquid. The gas stream laden with the stripped component is fed into a membrane operation and the liquid stream depleted of the stripped component is discharged or reused.

Alternatively, the batch process may be carried out in two stages by passing the batch once through the stripper and holding the liquid stream depleted of the stripped component in a batch tank. This liquid stream is passed once more through the gas stripper, which yields the desired degree of component stripping from the liquid. The gas stream laden with the stripped component is fed into a membrane operation and the liquid stream depleted of the stripped component is discharged or reused.

Alternatively, the batch process may be carded out in two stages by circulating the batch repeatedly around the loop formed by the batch tank and the first stripper. In a preferred mode of carrying out the process of the invention in this aspect, a batch of liquid is circulated in this loop for sufficient time to cause a desired degree of component stripping from the liquid. The gas stream laden with the stripped component is fed into a membrane operation and the liquid stream depleted of the stripped component is held in the batch tank. This liquid stream is fed to a second process. The second process could be a stripping operation under different conditions, which produces another gas stream laden with the stripped component, which may again be treated by the membrane unit, and another liquid stream depleted of the stripped component. Alternatively, the second treatment could be carried out using any other appropriate separation technology.

Advantages of a Stripper-Membrane Unit Operating in Batch Mode

Flexibility in treatment is the key advantage of a stripper operating batchwise rather than operating continuously. The combined stripper-membrane unit operating in batch mode has advantages over a continuous operation in treating streams that are small, intermittent, and vary in composition or concentration.

Small streams are not ideally suited for treatment by a continuous stripping operation because the high cost of continuous equipment and instrumentation is not justified. In contrast, because a batch operation requires little process control equipment, it offers an economically viable method of treatment.

A continuous operation is not capable of treating intermittent streams, while a batch operation is well adapted for it. A stripper operating continuously is limited to treating streams that are generated at nearly a constant rate. There is no such limitation when operating batchwise because the holding tank evens out streams that are generated intermittently.

A continuous operation is not ideally suited of treating streams with varying component concentration, while a batch operation is ideally suited for such streams. Variation in component concentration poses great difficulty for the preset process control parameters to monitor the continuous operation. In other words, if the feed concentration varies away from the expected narrow range of concentration, then the preset process control parameters may not provide optimum stripper operating conditions. In a batch operation, however, there is no such limitation because the holding tank evens out composition variations in streams.

In treating multicomponent streams to obtain relatively pure components, a stripper operating batchwise requires less capital than a stripper operating continuously. A continuous operation requires a separate stripper for each product (less one). Batchwise, the relatively pure components in a multicomponent stream are separated and removed by the same system in consecutive operations. In the first operation, the stripper is run under the conditions tailored to favor the removal of the most volatile component. The liquid stream generated by this operation is held in a batch tank. In the second operation, the stripper is run under conditions tailored to favor the removal of the next most volatile component. This cycle is repeated in the same system till all the components in the stream are separated.

The ability to vary the processing time of a stripping operation in batch mode offers an important advantage not available in continuous operation. In a batch process, a batch of liquid is circulated around a loop formed by the batch tank and the stripper for a sufficient amount of time to give the desired degree of component stripping. The number of circulations around this loop depends on the processing time of the batch operation, i.e. a longer processing time allows a greater number of circulations around the loop. Thus, the process time of a batch operation can be altered to get the required level of removal. Even if the feed solution varies in composition, a concentration sensor can be used to trigger the end of the cycle so that a constant discharge concentration is obtained. Stripping in this mode also allows solutions that are normally very difficult to handle, such as those with low Henry's Law coefficients, to be treated successfully. A conventional, one-pass continuous stripper could not be used to treat such solutions because it would have to be made impossibly large and/or use impossibly large amounts of stripping gas.

Unlike a continuous stripper-membrane operation, a batchwise operation can use low cost and non-fouling tray strippers and still achieve very good removal of dissolved components. In continuous stripping operations tray towers are not preferred because they have a limited number of theoretical stages. Since in a batch operation, the liquid stream is circulated around a closed loop formed by the gas stripper and the tank to achieve the desired concentration, a large number of theoretical plates are not required. Therefore, low cost tray towers can be employed in a batchwise stripping operation.

DETAILED DESCRIPTION OF THE INVENTION

Figure 1:
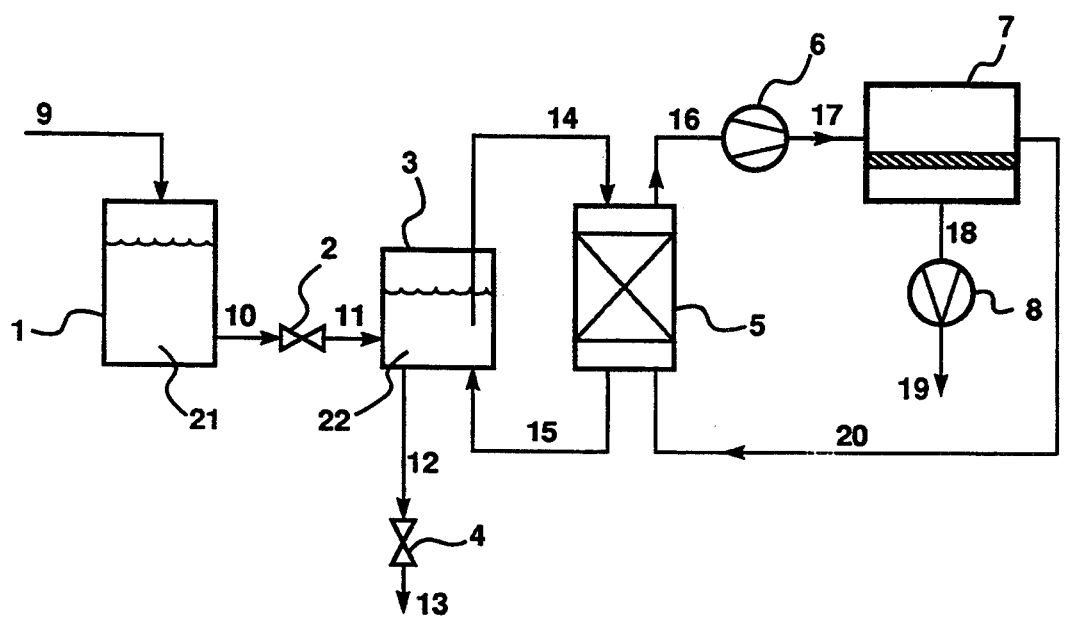
FIG. 1 is a schematic showing the main components of the apparatus for a typical process.

The invention concerns processes and apparatus involving a combination of gas-stripping operation, carried out in batch mode, followed by a membrane separation operation to treat the exhaust gas from the stripper. The gas stripper can be of any type, and of any flow configuration, that enables the component-laden gas to be confined and passed to the membrane unit for treatment. Low profile tray strippers are preferred, since they are particularly suited to handle the relatively low volume flow rates, typically below about 50 gpm, that are likely to be used in processing batches of liquid. Any type of stripper could be used, however, including towers of the spray, tray or packed type. The most preferred operating configuration is countercurrent, in which water passes from top to bottom of the tower and gas passes from bottom to top. Other configurations, for example, crossflow, in which water passes from top to bottom and air flows in at the sides, to the center and then out at the top, may also be used.

The stripping gas may be delivered by a forced draft blower or pump on the inlet side or by an induced draft system on the outlet side.

The membrane unit contains a membrane that exhibits a substantially different permeability for the component to be stripped than for the stripping gas. It may be relatively permeable to the stripped component but relatively impermeable to the stripping gas or permeable to the stripping gas but relatively impermeable to the stripped component. The membrane may take the form of a homogeneous membrane, an asymmetric membrane, a composite membrane, a membrane incorporating a gel or liquid layer or particulates, or any other form known in the Membranes made from rubbery or glassy materials may be used, depending on the specific separation to be performed. It is envisaged that the invention, among other things, will be used to remove organic contaminants from water, in which case rubbery polymers are preferred.

The form in which membranes are used in the invention is not critical. They may be used, for example, as flat sheets or discs, coated hollow fibers, or spiral wound modules, all forms that are known in the art. Spiral-wound modules are the most preferred choice.

The flux of a gas or vapor through a polymer membrane is proportional to the pressure difference of that gas or vapor across the membrane. To achieve high fluxes of the permeating components, it is desirable not only to make the permselective membrane thin, but also to operate the system with a substantial pressure drop across the membrane. This pressure drop can be achieved by drawing a vacuum on the permeate side of the membrane, by pressurizing the feed, or both.

In designing processes and apparatus that combine gas stripping with membrane separation, the operating constraints of the gas stripper and the membrane unit must be considered. In gas-stripping, the ratio of volume flow of gas to volume flow of liquid is important. If other factors are constant, to obtain a high level of component removal from the feed water this ratio should be such that the concentration of the component in the liquid, in equilibrium with the concentration of the component in the gas phase, approaches zero. This frequently means that the gas:water volume ratio is high, such as 50:1, 100:1 or higher, and the concentration of the component in the gas phase is very low. Thus, a gas stripper normally achieves high performance by using large volumes of stripping gas and creating a high-volume, low concentration exhaust.

Turning now to the membrane system, a number of factors affect the design and performance of the membrane unit. An important design consideration is the membrane feed gas flow rate. Upon this flow rate depend the membrane area required and the flow capacities of ancillary equipment, such as filters, pumps, condensers, etc. Thus, a lower feed gas flow rate enables a smaller membrane area and smaller pumps to be used. The capital and operating costs of the membrane unit are correspondingly reduced.

Important parameters that affect the performance of the membrane system include the selectivity, the feed:permeate ratio, the stage cut (total permeate flow/total feed flow) and the feed concentration. A single-stage membrane separation unit is typically able to remove 80–90% of the component from the feed gas to produce a component enriched stream that has at least 5–10 times the concentration of the feed gas. The enriched stream is usually, but not necessarily, condensed to recover the component in liquid form. If other factors are constant, the more dilute the feed stream, the more dilute is the enriched stream and more difficult it becomes to recover the component. Thus, membrane separation is favored for feed streams that are characterized by low volume and high concentration compared with gas-stripper exhaust streams.

These operating constraints appear to render combinations of gas-stripping and membrane separation unattractive, since the gas stripper and the membrane separation unit work best under conditions that are mutually contradictory: high volume, low-concentration for the stripping gas and low-volume, high concentration for the membrane feed gas. However, when the gas stripping step is performed in batch mode, preferably circulating the batch of liquid through the stripper repeatedly for a number of passes, we have found that it is possible to combine gas stripping with membrane gas separation in a number of useful ways.

Some representative descriptions of the best mode of carrying out the invention in its various aspects are described below. These embodiments are illustrative of workable configurations, but are not intended to limit the scope of the invention in any way. Those of skill in the art will appreciate that the embodiments described could be modified or combined and that many other embodiments in accordance with the invention are possible.

In all the embodiments described below, it is preferred that the overall treatment operation achieve at least about 60% removal of the component from the water and most preferably it should achieve at least about 90% removal.

For simplicity, the raw liquid from which a component or components are to be stripped is referred to as water throughout the specification. It will be apparent to those of ordinary skill in the art, however, that the processes of the invention are applicable to any liquid containing a strippable component, including organic solvents such as mineral oil, silicone oil, natural vegetable oils, for example soybean oil, high boiling esters, alcohols, ethylene glycol, propylene glycol and the like.

The component to be stripped will normally be substantially more volatile than the carder fluid. Representative components that may be stripped include volatile organic compounds such as BTEX aromatics, esters, alcohols and ketones used throughout the chemical processing industry, low molecular weight hydrocarbons, including chlorinated hydrocarbons, such as trichloroethylene, perchloroethylene and carbon tetrachloride, and numerous dissolved gases, such as oxygen, hydrogen sulfide, sulfur dioxide, chlorine, bromine, hydrogen cyanide and vinyl chloride.

1. Batch Mode with Recirculation

Figure 2:
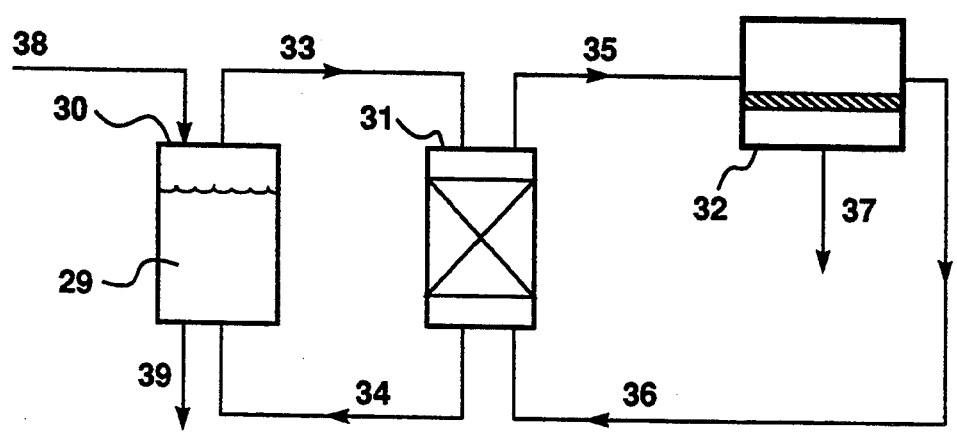
FIG. 2 is a schematic showing an embodiment of the invention in which the batchwise treated liquid is recirculated in a loop.

An embodiment of the invention in which the gas-stripping step is carded out batchwise, and in which processing is carded out by circulating the batch of liquid in multiple passes through the stripper is shown in FIG. 2. Referring now to this figure, feed liquid 38, enters tank 30. When processing begins, liquid 29 exits the tank as water stream 33 and enters gas stripper 31, which is used to remove the desired component from the liquid. The stripping gas enters the stripper as stream 36 and exits as stream 35. Gas stream 35 passes to a membrane separation unit 32. The stripped component passes preferentially through the membrane and emerges as permeate stream 37. The treated gas stream, depleted of the component, exits the membrane separation unit as stream 36. Stream 36 is recycled back to the stripper. Concurrently treated liquid stream 34, depleted of the stripped component, exits the stripper and is recycled back to tank 30. Liquid stream 34 is circulated around the loop formed between tank 30 and gas stripper 31 until it reaches the desired level of component removal and is then discharged as stream 39.

This figure is a schematic showing the process concept. The apparatus used to carry out the process will, of course, include other components. For example, a pump or a blower would normally be used between the membrane outlet and the stripper inlet to circulate the gas through the stripper. The pump or blower may be placed near the stripper inlet or elsewhere as convenient. Alternatively or additionally, a pump positioned in the gas outlet line from the stripper can be used to draw gas through the stripper. A filter may be installed upstream of the stripper or the membrane unit to remove particulates, oil or other contaminants from the water or gas streams entering the stripper or membrane unit. A compressor may be installed upstream of the membrane unit to raise the pressure of the membrane unit feed gas and thereby provide a transmembrane driving force. Alternatively, or additionally, a vacuum pump may be connected to the permeate side of the membrane unit to lower the permeate pressure and thereby provide or enhance the transmembrane driving force. If only a portion of the regenerated gas is reused, fresh stripping gas must be added at each pass through the stripper. This might be the case, for example, if nitrogen is used to provide an inerting stripping atmosphere. If oxygen leaks into the system, partial discharge of the treated stream may be used to keep the oxygen content of the stripping gas to a level safely below the lower explosion limit and the stripping gas may be topped up with fresh, high purity nitrogen. Partial discharge might also be appropriate if there are dischargeable components stripped from the water that are not well removed by the membrane unit.

A representative design in keeping with the general processing arrangement of FIG. 2 is shown in FIG. 1. Referring now to this figure, feed liquid 9 accumulates in holding tank 1 over time. A preset volume of liquid 21, exits the holding tank 1 as stream 10, passes through valve 2 and emerges as stream 11. Stream 11 enters batch tank 3 and collects as liquid 22. Valve 2 is shut off. Liquid circulation begins by driving a liquid circulation pump, not shown. Compressor 6 and vacuum pump 8 also start up simultaneously with the liquid circulation pump. Liquid 22 exits the batch tank 3 as liquid stream 14 and enters gas stripper 5, which is used to remove the desired component from the liquid. Liquid and gas flow countercurrent through the stripper. The stripping gas enters the stripper as stream 20 and exits as stream 16. Gas stream 16 passes through the compressor 6 and emerges as stream 17. Stream 17 is then fed into a membrane separation unit 7. The stripped component passes preferentially through the membrane and emerges as permeate stream 18, which is discharged as stream 19, driven by vacuum pump 8. The treated gas stream, depleted of the component, exits the membrane separation unit as stream 20. Stream 20 is recycled back to the stripper. Concurrently, treated liquid stream 15, depleted of the stripped component, exits the stripper and is recycled back into batch tank 3. Liquid stream 15 is recirculated around the loop formed between batch tank 3 and gas stripper 5 until it reaches the desired level of component removal and it then exits the batch tank as stream 12. Valve 4 opens and stream 12 is discharged as stream 13. A valve could also be installed downstream from the membrane separation unit where make up stripping gas is introduced into the stripper-membrane loop to off-set any loss of the stripping gas through the membrane permeate stream.

The capacity of holding tank 1 should preferably be about three to five times the volume of batch tank 3. Under typical operating conditions, the stripper removal loop and the membrane removal loop operate simultaneously. The stripper removal loop is formed between the batch tank 3 and the gas stripper 5, by combining batch tank 3, stream 14, gas stripper 5 and stream 15. The membrane removal loop is formed between gas stripper 5 and membrane separation unit 7, by combining gas stripper 5, stream 16, compressor 6, stream 17, membrane separation unit 7, and stream 20. Component removal in the stripper removal loop should preferably be between 1–30% per pass, that is liquid stream 15, exiting the stripper, must be 1–30% lower in component concentration than liquid stream 14, entering the stripper. Thus, the stripper removal loop acts in partial component removal mode. The membrane removal loop, similarly, acts in partial removal mode. Component removal in the membrane removal loop is usually less than 50% and typically between 5 and 30% is preferred. Thus if the average flow into the holding tank is 3 gpm, then the average recirculation flow rate around the stripper removal loop should be about ten to twenty times larger, that is 30–60 gpm. If the gas:water ratio is 10:1, the volume flow of the stripping gas stream 20 will be 300–600 gpm. The time taken to process a batch will obviously vary, depending on the volume of the batch, the flow rate, and the number of passes that need to be made. Typically, the processing time will be of the order of 5–300 minutes and the volume of the batch will be about 150–10,000 gal. If this volume of liquid completes one pass around the stripper removal loop every 5 to 30 minutes, the liquid will circulate through the loop 10–30 times over the complete processing cycle. Relatively low gas:water ratios, such as 50, 20, 10 or even 5 are preferred in the practice of the invention. The invention is, however, intended to provide standard systems and processes that can treat streams of many different flow rates and compositions, and to remove a wide range of components of diverse properties. The Henry's Law coefficients of the components that could be stripped vary over at least four orders of magnitude, for example. Thus, much higher and more conventional gas:water ratios, such as 100, 200, 500 or more may be needed in specific situations. It should be appreciated that what has been described here are typical operating conditions intended to make clear the functioning of a representative cycle, and that operating conditions different from those above are also intended within the scope of the invention.

FIGS. 1 and 2 show the membrane separation operation as a single-stage operation. If the permeate from the first stage is too dilute for recovery or further treatment, a multistage membrane system, in which the permeate from one stage becomes the feed to the next, can be used. If the exhaust gas from the stripper is too dilute for recovery or further treatment, two or three membrane stages may be required to achieve sufficient concentration of the permeate. It will be appreciated by those of skill in the art that many possible configurations for the membrane system are possible. Specific drawings showing gas strippers combined with two-and three-stage membrane systems are shown in parent application No. 890,931, now U.S. Pat. No. 5,273,572, as FIGS. 5 and 6, for example. The membrane system may also include "one-and-a-half" stage or "two-and-a-half" stage membrane arrangements, as described in U.S. Pat. NO. 5,071,451. In these types of design, an auxiliary membrane module or set of modules is installed across the pump on the downstream side of the membrane stage, thereby improving the performance and operating efficiency of that stage.

As yet another example, the membrane system may operate in high pressure mode with a compressor and a condenser upstream of the membrane modules, so that the component that is stripped is recovered by condensation, as shown, for example, in FIG. 7 of the parent application Ser. No. 890, 931, now U.S. Pat. No. 5,273,572.

For simplicity the representative embodiments above have been described for the case where the membrane is selectively permeable to the component over the stripping gas, so that the membrane permeate stream is the component-enriched stream and the membrane residue stream is the component-depleted stream. Those of skill in the art will recognize that comparable processes can be designed using membranes selectively permeable to the stripping gas. In this case, the purified gas stream for reuse or discharge will be the membrane permeate stream, and the component-enriched stream will be the membrane residue stream. Such embodiments may be preferred when the component content of the gas stream to be treated is unusually high, for example.

Embodiments such as those shown conceptually in FIG. 2, and specifically in FIG. 1, that reuse all or part of the stripping gas have several advantages. Most gas strippers use air as the stripping gas. However, there are circumstances in which it would be beneficial to use a different stripping gas, for example, nitrogen or carbon dioxide if the component forms potentially explosive mixtures with air. Because stripping uses and discharges very large volumes of gas, to use other gases is usually impractical and/or too costly. If the gas can be cleaned and reused, however, the amount and cost of gas used is limited and it becomes practical to strip with other gases. Inerting is one reason to use other gases than air. In this case, nitrogen, carbon dioxide, argon, or any other appropriate inerting gas can be used. Alternatively, a stripping gas appropriate to the ultimate destination of the component can be used. For example, if the component is to be disposed of, not recovered, methane can be used as the stripping gas. The membrane unit is then used to produce a permeate stream enriched in the component and containing just enough methane to make disposal by incineration practical. The stripping gas can also be chosen to provide improved partitioning between the gas and water phases.

A second advantage is that reuse of the stripping gas can ease the separation burden placed on the membrane unit. If the treated gas is not discharged, a higher concentration of component in the component-depleted stream may be acceptable or even desirable than would be permitted for release into the atmosphere. In designs such as those of FIGS. 1 and 2, where both the stripping and the membrane separation are carried out in 'loop' mode, a degree of matching between the level of removal achieved per pass by the stripper and the level of removal achieved by the membrane unit improves the overall efficiency of the operation. Thus, if the stripper achieves about 30% removal or less per pass, the membrane unit should also achieve a relatively low degree of removal, preferably 50% or less. If an embodiment using a component-selective membrane is used, this lesser removal requirement enables the membrane unit to be operated at a low stage cut, thereby keeping the permeate concentration high and facilitating recovery of the component from the permeate stream.

Reuse of the stripping gas is preferred. The invention is not limited to a closed loop operation on the membrane side, however, and many workable and useful configurations in which fresh stripping gas is used, treated, then discharged are possible.

Complementary operation of the gas stripper and the membrane unit is facilitated by operating the gas-stripping step under reduced pressure compared with the membrane separation step. Suppose, for example, the stripper is operated at a gas pressure of 0.5 atm by connecting a vacuum pump in the outlet line from the gas stripper between the gas stripper and the membrane unit and further suppose that the downstream side of the vacuum pump is at 1 atm pressure. Then the pressure on the feed side of the membrane is twice that within the stripper, the volume flow of gas passing through the membrane unit is half that passing through the gas stripper and the volume concentration of component entering the membrane unit will be twice the equilibrium concentration in the gas stripper. In this way the gas volume is reduced and its concentration increased before it reaches the membrane unit for treatment. The same concentrating effect may be achieved by using a compressor between the stripper and the membrane unit.

A further advantage of running the gas stripper at subatmospheric, rather than atmospheric, pressure is that enhanced partitioning of the component from the water into the gas is achieved. In FIGS. 1 and 2, the batch tank (3 or 30) from which the liquid is recirculated is shown without any attempt to segregate the outflowing and return streams. Optionally, the system performance may be improved by installing baffles or other turbulent inhibitors in the tank, and/or by adjusting the shape of the tank and the positions of the inlet and outlet pipes, thereby reducing mixing in the tank.

In all embodiments, transfer of component from the liquid phase into the gas phase in the stripper is enhanced by heating the water stream. Direct heating may be used, but it is preferable wherever possible to design the combined gas stripping/membrane separation apparatus to take advantage of heat exchange possibilities. As nonlimiting examples, the incoming feed water may be warmed by using it to cool any vacuum pumps or compressors used in the apparatus. If chilling is used to condense some of the component prior to entry into the membrane unit, the gas passing through the membrane unit will be cool. This gas can be used to cool any vacuum pumps or compressors in the apparatus and then returned warm to the gas stripper. Depending on the specific system design and components, many such heat-integration arrangements will be apparent to those of skill in the art.

Embodiments of the invention in which steam forms all or at least part of the stripping gas are contemplated. The steam carries heat into the stripping tower and facilitates component removal by heating the fluid to be stripped. The steam also provides a volume of gas into which the dissolved component can partition. Some steam condenses as it passes through the stripper, resulting in concentration of the component in the remaining noncondensed strip gas. The steam in the exit stripping gas can be condensed before the exhaust gas is passed to the membrane unit for treatment. This has a similar effect to drawing a partial vacuum on the stripper, in that the volume of gas passing to the membrane unit is reduced compared with the volume of strip gas and the concentration of component in the gas is, therefore, increased.

Figure 5A:
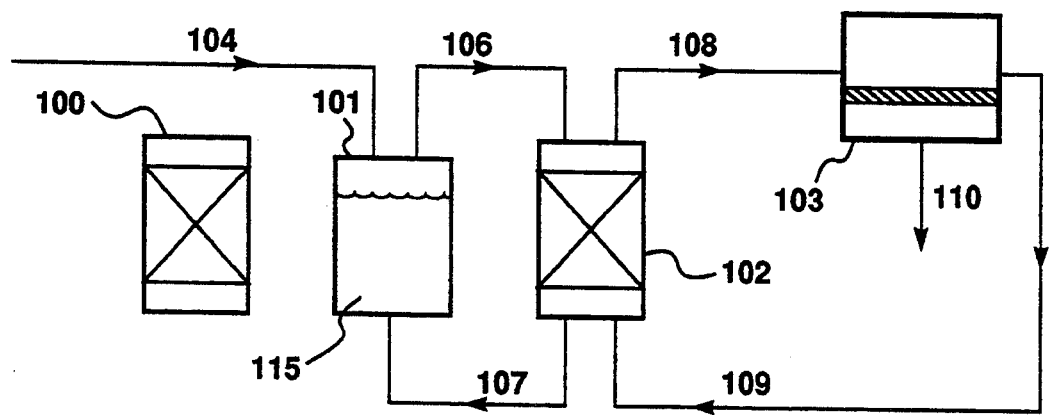
FIGS. 5a and 5b are schematics showing an embodiment of the invention in which the batchwise treated liquid is recirculated in a loop during the first operation and the second operation is a single pass through the gas stripper.
Figure 5B:
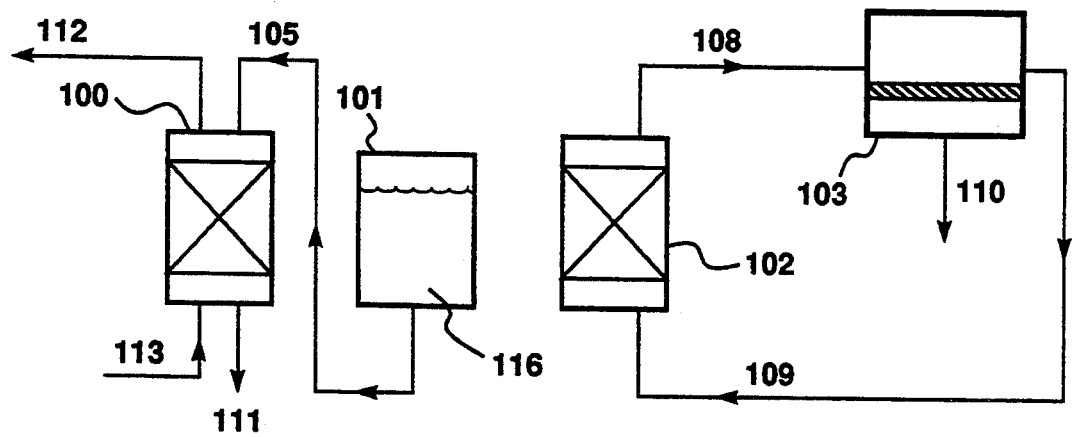

Optionally the liquid that has been treated as described above may be subject to additional treatment, by gas-stripping or otherwise. FIGS. 5a and 5b show a non-limiting, representative operation. Referring now to these figures, which show two gas-stripping operations, the first operation (FIG. 5a) begins when feed liquid 104, enters, tank 101. After achieving the desired level, liquid 115 exits the tank as stream 106 and enters gas stripper 102, which is used to remove the desired component from the liquid. The stripping gas enters the stripper as stream 109 and exits as stream 108. Gas stream 108 passes to a membrane separation unit 103. The stripped component passes preferentially through the membrane and emerges as permeate stream 110. The treated gas stream, depleted of the component, exits the membrane separation unit as stream 109. Stream 109 is recycled back to the stripper. Concurrently treated liquid stream 107, depleted of the stripped component, exits the stripper and is recycled back to tank 101. Liquid stream 107 is circulated around the loop formed between tank 101 and gas stripper 102 until it achieves the desired level of component removal. The first operation ends as soon as the desired level of component removal is achieved.

The second operation (FIG. 5b) then begins as the treated liquid 116, depleted of the stripped component, exits tank 101 as stream 105 and enters stripper 100, which is used to remove the desired component from the liquid. The stripping gas enters the stripper as stream 113 and exits as stream 112. The treated liquid, depleted of the stripped component, exits the stripper as liquid stream 111. The second operation ends when the entire batch is processed through the stripper. Gas stream 112 could be discharged or could be processed through a membrane operation and recycled or discharged.

The second gas-stripping step may be carried out in one pass or by recirculation. Because the water passing to the second stripping step contains relatively little component, the gas from the second step may frequently be dischargeable. The same stripper or two strippers, of the same type or different types, may be used for this second stripping step. For example, the first stripper can be a low profile tray stripper and the second can be a packed tower. The two strippers may also be of the same type, but operating under different conditions to achieve a different result. For example, the first may operate at a relatively low gas:water volume ratio such as less than about 50:1 or lower, such as less than about 20:1 or even 10:1; the second may operate at a higher gas:water volume ratio, such as greater than about 10:1 or greater than about 50:1. It will be apparent to those of skill in the art that many different combinations of stripping system can be employed.

Alternatively, this additional treatment step may be carried out by some other treatment process. For example, the concentration of component in the treated water exiting the first stripper will normally be reduced to a small percentage of its original value. This may bring the stream into a concentration range where treatment by adsorption, absorption, catalytic incineration, chemical destruction, ozonation, biological treatment, etc. may be appropriate and may have technical or financial advantages over using a second stripper. As a second example, the water to be treated may contain both volatile, chlorinated compounds and less volatile, nonchlorinated compounds. If the first stripper is used to remove the chlorinated compounds, the residual compounds may be treated safely and effectively by a biological plant.

2. Batch Mode Single Pass Combined with Recirculation

Figure 3A:
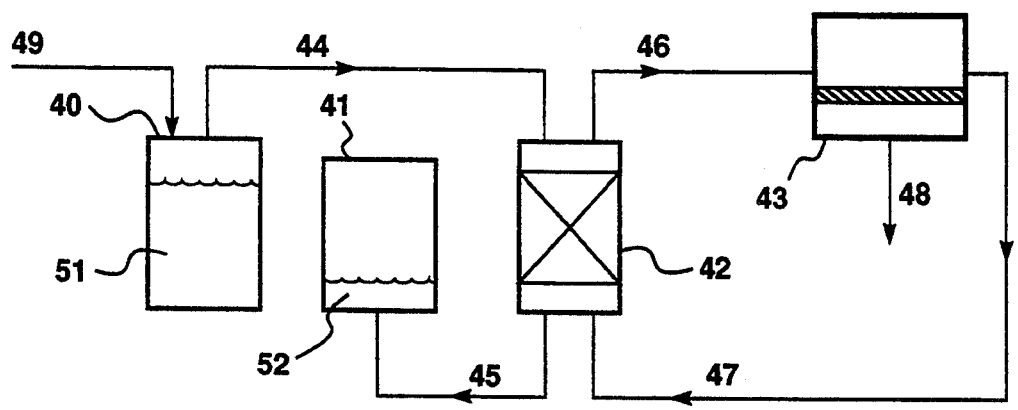
FIGS. 3a and 3b are schematics showing an embodiment of the invention in which the first operation is a single pass through the gas stripper and the second operation is recirculation around the loop.
Figure 3B:
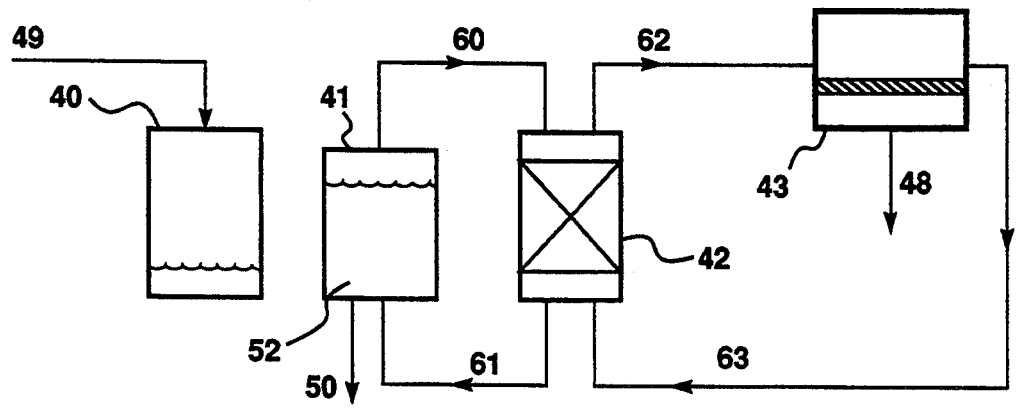

An alternative embodiment in which the gas stripping step is carried out in two operations is shown in FIGS. 3a and 3b. The first operation (FIG. 3a) begins when feed liquid 49, enters, tank 40. After reaching the desired level, liquid 51 exits the tank as stream 44 and enters gas stripper 42, which is used to remove the desired component from the liquid. The stripping gas enters the stripper as stream 47 and exits as stream 46. Gas stream 46 passes to a membrane separation unit 43. The stripped component passes preferentially through the membrane and emerges as permeate stream 48. The treated gas stream, depleted of the component, exits the membrane separation unit as stream 47. Stream 47 is recycled back to the stripper. Concurrently, treated liquid stream 45, depleted of the stripped component, exits the stripper and enters tank 41. The first operation ends when the entire batch is processed through the stripper and accumulates in tank 41 as liquid 52.

The second operation (FIG. 3b) begins when liquid 52 exits tank 41 as liquid stream 60 and enters gas stripper 42, which is used to remove the desired component from the liquid. The stripping gas enters the stripper as stream 63 and exits as stream 62. Gas stream 62 passes to a membrane separation unit 43. The stripped component passes preferentially through the membrane and emerges as permeate stream 64. The treated gas stream, depleted of the component, exits the membrane separation unit as stream 63. Stream 63 is recycled back to the stripper. Concurrently, treated liquid stream 61, depleted of the stripped component, exits the stripper and is recycled back to tank 41. Liquid stream 61 is recirculated around the loop formed between tank 41 and gas stripper 42 until it achieves the desired level of component removal. The second operation ends when liquid 52 is discharged as liquid stream 50.

3. Multiple Single Passes in Batch Mode

Figure 4A:
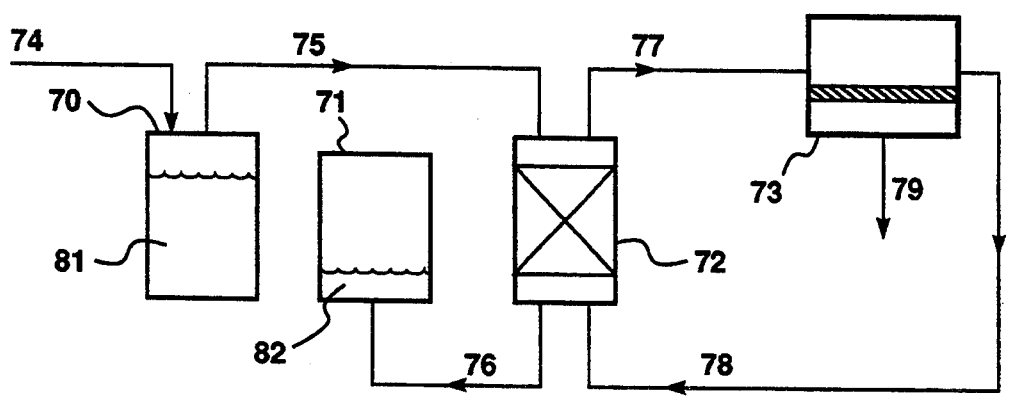
FIGS. 4a and 4b are schematics is a schematic showing an embodiment of the invention in which the first operation is a single pass through the gas stripper and the second operation is another single pass through the gas stripper.
Figure 4B:
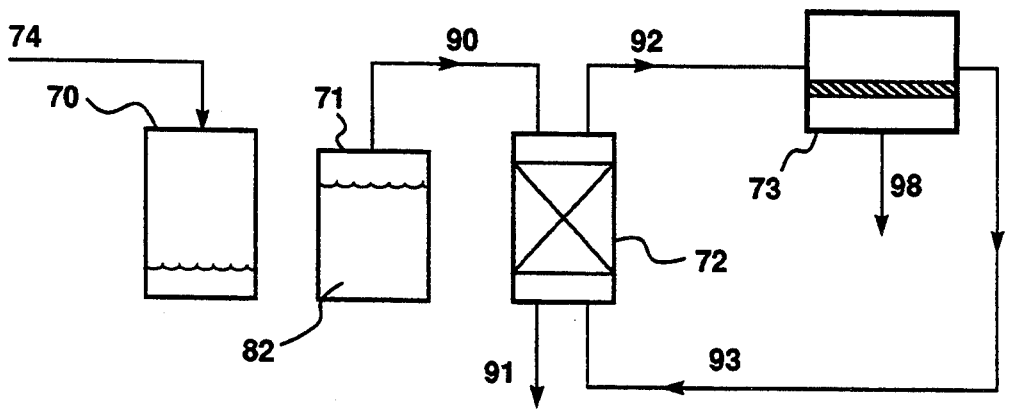

An alternative embodiment in which the gas stripping step is carded out in two operations is shown in FIGS. 4a and 4b. The first operation (FIG. 4b) begins when feed liquid 74, enters, tank 70. After reaching the desired level, liquid 81 exits the tank as stream 75 and enters gas stripper 72, which is used to remove the desired component from the liquid. The stripping gas enters the stripper as stream 78 and exits as stream 77. Gas stream 77 passes to a membrane separation unit 73. The stripped component passes preferentially through the membrane and emerges as permeate stream 79. The treated gas stream, depleted of the component, exits the membrane separation unit as stream 78. Stream 78 is recycled back to the stripper. Concurrently treated liquid stream 76, depleted of the stripped component, exits the stripper and enters tank 71. The first operation ends when the entire batch is processed through the stripper and accumulates in tank 71 as liquid 82.

The second operation (FIG. 4b) begins when liquid 82 exits tank 71 as liquid stream 90 and enters gas stripper 72, which is used to remove the desired component from the liquid. The stripping gas enters the stripper as stream 93 and exits as stream 92. Gas stream 92 passes to a membrane separation unit 73. The stripped component passes preferentially through the membrane and emerges as permeate stream 94. The treated gas stream, depleted of the component, exits the membrane separation unit as stream 93. Stream 93 is recycled back to the stripper. Concurrently, treated liquid stream 91, depleted of the stripped component, exits the stripper and is discharged. The second operation ends when the entire batch is processed through the stripper and discharged as stream 91.

Advantages of Using the Configuration shown by FIGS. 3a and 3b and FIGS. 4a and 4b There are many advantages of the "batch-mode single pass combined with recirculation" configuration, as shown in FIGS. 3a and 3b, and the "multiple single passes in batch mode" configuration, as shown in FIGS. 4a and 4b. The two step stripping operation provides significant flexibility in treatment of (i) multicomponent streams, and (ii) cases where the amount of component removal achieved in the first pass through the stripper is relatively high, (that is, more than about 50%), for example.

In the case of treating a multicomponent stream, consider a liquid stream, containing component one and component two in a liquid, where component one is more volatile than component two. In the first operation, this liquid stream enters the stripper for treatment. The first stripping operation is performed under conditions tailored to favor the removal of component one. A concentrate of component one is recovered from the permeate stream of the membrane separation unit. The first operation comes to an end when the liquid stream depleted of component one and mainly containing component two is collected in a tank. The second stripping operation begins when this batch of liquid is fed into the same stripper again. The second stripping operation is performed under conditions tailored to favor the removal of component two and a concentrate of component two is recovered from this step. For treating liquid streams containing more than two components, additional similar batchwise operations could be performed. FIGS. 3a and 3b show the configuration where the second operation would require multiple passes around the stripper to achieve the desired level of component removal; FIGS. 4a and 4b show the configuration where the second operation requires a single pass for the desired removal. In both these configurations, the first operation could also be performed as shown in FIG. 2, where the first operation requires multiple passes through the stripper. The significant advantage of this batch design is that additional strippers are not necessary as would be necessary if the multicomponent stream was treated in a continuous stripping operation.

In the case where the amount of component removal achieved in the first pass through the stripper is relatively high, (that is more than about 50%), but not sufficient for discharge, consider a volatile component with a high Henry's law coefficient, methylene chloride for example, in the liquid stream entering the stripper. Because the component is very volatile, the first stripping operation achieves a relatively high (more than 50%) component removal and produces a liquid stream, which is significantly depleted of the stripped component. If this treated liquid stream is circulated back to the tank, which still contains some untreated liquid, as shown in FIG. 2, mixing of a very dilute and a very concentrated batch of liquid will occur, thereby making component removal in the stripping operation inefficient. Although installing baffles in the FIG. 2 tank will minimize mixing and reduce the inefficiency of the stripping operation, an alternative design using a batch tank is also available. FIGS. 3a and 3b and FIGS. 4a and 4b show that, instead of recycling the liquid stream significantly depleted in the stripped component to the tank under treatment, it is held in a second separate tank, which avoids mixing a batch of treated and a batch of untreated liquids. A second stripping operation is performed to treat the liquid in the second tank, and to achieve the desired level of component removal. In FIG. 3b, the second stripping operation is performed with the liquid stream recirculating in a closed loop between the batch tank and stripper, while in FIG. 4b the same operation is performed in an open loop where the liquid stream is discharged from the stripper after treatment.

The invention is now further illustrated by the following examples, which are intended to be illustrative of the invention, but are not intended to limit the scope or underlying principles of the invention in any way.

EXAMPLES

Example 1

The performance of a combined gas-stripper/membrane system configured substantially as in FIG. 1 in treating water contaminated with 1% methylethylketone (MEK) was calculated. The calculations were performed using a custom-designed stripping/membrane separation computer modeling program developed at MTR. The following assumptions were made:

| Stripping gas: | Air or nitrogen |
|---|---|
| Water flow rate through stripper: | 10 gpm |
| Henry's Law coefficient of MEK: | 1.6 atm |
| Air flow rate through stripper: | 250 scfm |
| Feed pressure provided by compressor, 6: | 150 psia |
| Permeate pressure provided by vacuum pump, 19: | 3 psia |
| Membrane selectivity for MEK/nitrogen: | 30 |

The compositions of the stripper inlet and outlet water and the membrane feed, permeate and residue streams after one pass through the system are given in Table 1. The ongoing flow rates of the streams are also shown.

TABLE 1

| Stream # | 14 | 15 | 17 | 20 | 19 |
|---|---|---|---|---|---|
| MEK concentration (%) | 1.0 | 0.915 | 0.39 | 0.25 | 5.4 |
| Water concentration (%) | | | 0.5 | 0.2 | 10.7 |
| Flow rate (gpm for water, scfm for gas) | 10 | 10 | 250 | 243 | 7 |

In one pass, the stripper removes about 8.5% of the MEK from the water and the membrane removes about 38% of the MEK from the nitrogen. As can be seen from the table, the membrane is also very efficient at removing water vapor that is carried into the stripping stream. The membrane area required to operate at this capacity is about 5 m$^2$. Based on these results, about 15–20 circulations through the stripping loop would be needed to achieve essentially complete removal of the MEK from the water.

Example 2

The calculations of Example 1 were repeated for a 1% solution of ammonia in water. The assumptions were as follows:

| Stripping gas: | Air or nitrogen |
|---|---|
| Water flow rate through stripper: | 10 gpm |
| Henry's Law coefficient of ammonia: | 0.7 atm |
| Air flow rate through stripper: | 250 scfm |
| Feed pressure provided by compressor, 6: | 150 psia |
| Permeate pressure provided by vacuum pump, 19: | 3 psia |
| Membrane selectivity for ammonia/nitrogen: | 20 |

The compositions of the stripper inlet and outlet water and the membrane feed, permeate and residue streams after one pass through the system are given in Table 2. The ongoing flow rates of the streams are also shown.

TABLE 2

| Stream # | 14 | 15 | 17 | 20 | 19 |
|---|---|---|---|---|---|
| Ammonia concentration (%) | 1.0 | 0.966 | 0.78 | 0.54 | 8.2 |
| Water concentration (%) | | | 0.5 | 0.2 | 10.1 |
| Flow rate (gpm for water, scfm for gas) | 10 | 10 | 250 | 242 | 8 |

In one pass, the stripper removes about 3.4% of the ammonia from the water and the membrane removes about 33% of the ammonia from the nitrogen. As can be seen from the table, the membrane is also very efficient at removing water vapor that is carded into the stripping stream. The membrane area required to operate at this capacity is about 5 m$^2$. Based on these results, about 30–40 circulations through the stripping loop would be needed to achieve essentially complete removal of the ammonia from the water.

Example 3

The calculations of Example 1 were repeated for a 0.1% solution of benzene in water. The assumptions were as follows:

| Stripping gas: | Air or nitrogen |
|---|---|
| Water flow rate through stripper: | 10 gpm |
| Henry's Law coefficient of benzene: | 230.9 atm |
| Air flow rate through stripper: | 250 scfm |
| Feed pressure provided by compressor, 6: | 150 psia |
| Permeate pressure provided by vacuum pump, 19: | 3 psia |
| Membrane selectivity for benzene/nitrogen: | 50 |

The compositions of the stripper inlet and outlet water and the membrane feed, permeate and residue streams after one pass through the system are given in Table 3. The ongoing flow rates of the streams are also shown.

TABLE 3

| Stream # | 14 | 15 | 17 | 20 | 19 |
|---|---|---|---|---|---|
| Benzene concentration (%) | 0.1 | 245 ppm | 0.23 | 0.12 | 4.0 |
| Water concentration (%) | | | 0.5 | 0.2 | 10.4 |
| Flow rate (gpm for water, scfm for gas) | 10 | 10 | 250 | 242 | 7.5 |

In one pass, the stripper removes about 75.5% of the benzene from the water and the membrane removes about 51% of the benzene from the nitrogen. As can be seen from the table, the membrane is also very efficient at removing water vapor that is carded into the stripping stream. The membrane area required to operate at this capacity is about 5 m². Based on these results, a relatively high degree of stripping is achieved in just a single pass of the benzene-laden batch through the stripper. Thus, the system is oversized if it is always to be used to remove benzene in recirculation mode. When the recirculated solution, containing only about 250 ppm benzene is returned to the batch tank, it will mix with the as-yet untreated liquid containing 1,000 ppm, thereby reducing the efficiency of the process considerably. As a result, even though the removal per pass is more than 70%, it will take up to 5 passes or more to achieve 95%+removal of benzene from the water.

In this case, efficiency will be improved if the tank contains baffles or other devices to reduce mixing of the outgoing and return liquid portions. Alternatively, the process could be carried out according to embodiment number 3, discussed above, and shown in FIGS. 4a and 4b, in which multiple single passes through the stripper are used. When the first single pass is complete, the liquid that has collected in the second tank is subjected to a single pass through the stripper, and can conveniently, although not necessarily, be collected back in the first tank. Since no mixing takes place, removal follows a simple progression, such as 70% in pass one, $(70+(30/100\times 70))=91\%$ in pass two, and so on.

Example 4

The calculations of Example 1 were repeated for a 1% solution of methylene chloride in water. The assumptions were as follows:

| Stripping gas: | Air or nitrogen |
|---|---|
| Water flow rate through stripper: | 10 gpm |
| Henry's Law coefficient of methylene chloride: | 156 atm |
| Air flow rate through stripper: | 250 scfm |
| Feed pressure provided by compressor, 6: | 150 psia |
| Permeate pressure provided by vacuum pump, 19: | 3 psia |
| Membrane selectivity for methylene chloride/nitrogen: | 40 |

The compositions of the stripper inlet and outlet water and the membrane feed, permeate and residue streams after one pass through the system are given in Table 4. The ongoing flow rates of the streams are also shown.

TABLE 4

| Stream # | 14 | 15 | 17 | 20 | 19 |
|---|---|---|---|---|---|
| Methylene chloride conc. (%) | 1.0 | 0.24 | 2.9 | 1.8 | 28.5 |
| Water concentration (%) | | | 0.5 | 0.2 | 8.6 |
| Flow rate (gpm for water, scfm for gas) | 10 | 10 | 250 | 240 | 10 |

In one pass, the stripper removes about 76% of the methylene chloride from the water and the membrane removes about 40% of the methylene chloride from the nitrogen. As can be seen from the table, the membrane is also very efficient at removing water vapor that is carried into the stripping stream. The membrane area required to operate at this capacity is about 5 m². Based on these results, a relatively high degree of stripping is achieved in just a single pass of the methylene chloride-laden batch through the stripper. As with the benzene example, the system is slightly oversized if it is always to be used to remove methylene chloride in recirculation mode.

Comparing Examples 1-4, it may be seen that a single system of fixed stripper and membrane size and with fixed operating flow rates could be used to treat water streams containing very different contaminants, from hydrophobic, volatile organic compounds with high Henry's Law coefficients of 200 atm or more to inorganic gases with low Henry's Law coefficients of less than 1 atm, simply by varying the processing time.

Example 5

The calculations of Example 1 for a stream contaminated with 1% MEK were repeated. In this case, however, the membrane portion of the system was assumed to be operated without the vacuum pump on the permeate side and with a condenser between the compressor and the membrane unit. Such a design is shown, for example, in the membrane portion of FIG. 7 of parent application No. 890,931, now U.S. Pat. No. 5,273,572. The other assumptions were as follows:

| Stripping gas: | Air or nitrogen |
|---|---|
| Water flow rate through stripper: | 10 gpm |
| Henry's Law coefficient of MEK: | 1.6 atm |
| Air flow rate through stripper: | 500 scfm |
| Feed pressure provided by compressor: | 150 psia |
| Permeate pressure: | 15 psia |
| Membrane selectivity for MEK/nitrogen: | 30 |

The compositions of the stripper inlet and outlet water, the membrane feed, permeate and residue streams and the liquid stream from the condenser after one pass through the system are given in Table 5. The ongoing flow rates of the streams are also shown.

TABLE 5

| Stream # | 14 | 15 | Condensate | Feed | Residue | Permeate |
|---|---|---|---|---|---|---|
| MEK concentration (%) | 1.0 | 0.79 | 64 | 0.22 | 0.2 | 1.6 |
| Water concentration (%) | | | 36 | 0.11 | 0.1 | 1.0 |
| Flow rate (gpm for water, scfm for gas) | 10 | 10 | | 503 | 497 | 6 |

In this case, with a higher gas flow rate, the stripper removes about 21% of the MEK from the water and the membrane removes about 46% of the MEK from the nitrogen. The membrane area remains at about 5 m². In this design, about 5-10 circulations through the stripping loop would be needed to achieve essentially complete removal of the MEK from the water.

We claim:

1. A process for removing a component from a liquid, comprising the steps of:
    (a) providing a gas stripper, adapted to contact gas and liquid, and a tank, said stripper and said tank being connected in a loop;
    (b) carrying out a gas-stripping step, comprising circulating a batch of liquid in said loop for a sufficient time to cause a desired degree of stripping of said component from said liquid by said gas, thereby producing a component-depleted liquid stream and a component-laden gas stream;

(b) passing said component-laden gas stream to a membrane separation step, comprising:

(i) providing a membrane having a feed side and a permeate side;

(ii) contacting said feed side with said component-laden gas stream;

(iii) withdrawing from said membrane an enriched gas stream enriched in said component compared with said component-laden gas stream;

(iv) withdrawing from said membrane a depleted gas stream depleted in said component compared with said component-laden gas stream.

2. The process of claim 1, wherein said component comprises an organic compound.

3. The process of claim 2, wherein said organic compound is selected from the group consisting of trichloroethylene, perchloroethylene and carbon tetrachloride.

4. The process of claim 1, wherein said component comprises an inorganic substance.

5. The process of claim 1, wherein said liquid comprises water.

6. The process of claim 1, wherein said membrane separation step further comprises:

(v) reusing at least a part of said depleted gas stream as stripping gas.

7. The process of claim 6, wherein said membrane separation step achieves removal of less than 50% of said component from said component-laden gas stream.

8. The process of claim 1, wherein said membrane separation step includes providing a partial vacuum on the permeate side of the membrane.

9. The process of claim 1, wherein said membrane separation step includes compressing said component-laden gas stream above atmospheric pressure prior to bringing it into contact with said feed side.

10. The process of claim 1, wherein said membrane separation step is accomplished using one membrane stage.

11. The process of claim 1, wherein said membrane separation step is accomplished using multiple membrane stages.

12. The process of claim 1, further comprising passing said component-depleted liquid stream to a second gas-stripping step.

13. The process of claim 1, wherein said component is recovered from said enriched gas stream by condensation.

14. The process of claim 1, wherein said gas comprises air.

15. The process of claim 1, wherein said gas comprises nitrogen.

16. The process of claim 1, wherein said gas comprises steam.

17. The process of claim 1, wherein said enriched gas stream is a permeate gas stream.

18. The process of claim 1, wherein said enriched gas stream is a residue gas stream.

19. The process of claim 1, wherein said gas is at subatmospheric pressure during said gas-stripping step.

20. The process of claim 1, wherein said gas-stripping step achieves removal of less than about 20% of said component from said liquid per pass through said loop.

21. The process of claim 1, wherein said gas stripping step is adapted to contact gas and liquid in a gas:liquid ratio of about 10:1.

22. The process of claim 1, wherein said gas stripper is a tray stripper.

23. The process of claim 1, further comprising accumulating said liquid in a holding vessel prior to treatment and passing a quantity of said liquid from said holding vessel to said tank for treatment.

24. The process of claim 1, wherein said liquid contains at least two components, one component being more readily strippable and the second component being less readily strippable, and wherein the majority of said more readily strippable component is stripped and separated as a first enriched gas stream and said less readily strippable component is subsequently stripped and separated as a second enriched gas stream.

25. A process for removing a component from a liquid, comprising the steps of:

(a) introducing a flow of liquid to a gas-stripper adapted to contact gas and liquid, thereby carrying out a first gas-stripping step that produces a component-depleted liquid stream and a first component-laden gas stream;

(b) passing said first component-laden gas stream to a first membrane separation step, comprising:

(i) providing a membrane having a feed side and a permeate side;

(ii) contacting said feed side with said first component-laden gas stream;

(iii) withdrawing from said membrane a first enriched gas stream enriched in said component compared with said first component-laden gas stream;

(iv) withdrawing from said membrane a first depleted gas stream depleted in said component compared with said first component-laden gas stream;

(c) passing said component-depleted liquid stream to a tank, said tank being connectable with said stripper in a liquid-transferring loop;

(d) when said first gas-stripping step is finished, connecting said tank and said stripper in said liquid-transferring loop;

(e) carrying out a second gas-stripping step, comprising circulating said component-depleted liquid stream in said liquid-transferring loop for a sufficient time to cause a desired degree of stripping of said component from said component-depleted liquid stream, thereby producing a further-depleted liquid stream and a second component-laden gas stream;

(f) passing said second component-laden gas stream to a second membrane separation step, comprising:

(i) providing a membrane having a feed side and a permeate side;

(ii) contacting said feed side with said second component-laden gas stream;

(iii) withdrawing from said membrane a second enriched gas stream enriched in said component compared with said second component-laden gas stream;

(iv) withdrawing from said membrane a second depleted gas stream depleted in said component compared with said second component-laden gas stream.

26. The process of claim 25, wherein said component comprises an organic compound.

27. The process of claim 26, wherein said organic compound is selected from the group consisting of trichloroethylene, perchloroethylene and carbon tetrachloride.

28. The process of claim 25, wherein said component comprises an inorganic substance.

29. The process of claim 25, wherein said liquid comprises water.

30. The process of claim 25, wherein said membrane separation steps further comprise:
(v) reusing at least a part of said depleted gas streams as stripping gas.

31. The process of claim 30, wherein said membrane separation steps achieve removal of less than 50% of said component from said component-laden gas streams.

32. The process of claim 25, wherein said membrane separation steps include providing a partial vacuum on the permeate side of the membrane.

33. The process of claim 25, wherein said membrane separation steps include compressing said component-laden gas streams above atmospheric pressure prior to bringing them into contact with said feed side.

34. The process of claim 25, wherein said membrane separation steps are accomplished using one membrane stage.

35. The process of claim 25, wherein said membrane separation steps are accomplished using multiple membrane stages.

36. The process of claim 25, wherein said liquid contains at least a first component and a second component, and wherein the majority of said first component is removed in said first gas-stripping step and the majority of said second component is removed in said second gas-stripping step.

37. The process of claim 25, wherein said component is recovered from at least one of said enriched gas streams by condensation.

38. The process of claim 25, wherein said gas comprises air.

39. The process of claim 25, wherein said gas comprises nitrogen.

40. The process of claim 25, wherein said gas comprises steam.

41. The process of claim 25, wherein said enriched gas streams are permeate gas streams.

42. The process of claim 25, wherein said enriched gas streams are a residue gas streams.

43. The process of claim 25, wherein said gas is at subatmospheric pressure during said gas-stripping steps.

44. The process of claim 25, wherein said second gas-stripping step achieves removal of less than about 20% of said component from said liquid per pass through said loop.

45. The process of claim 25, wherein said second gas-stripping step is adapted to contact gas and liquid in a gas:liquid ratio of about 10:1.

46. The process of claim 25, wherein said gas stripper is a tray stripper.

47. The process of claim 25, wherein step (c) comprises:
(c) passing said component-depleted liquid stream to a tank; and wherein said steps (d) and (e) are combined as follows:
(d) when said first gas-stripping step is finished, introducing said component-depleted liquid stream to said gas stripper, thereby carrying out a second gas-stripping step that produces a further-depleted liquid stream and a second component-laden gas stream.

48. The process of claim 25, further comprising accumulating said liquid in a holding vessel prior to treatment.

* * * * *